US008391679B2

(12) United States Patent  
Ogasawara

(10) Patent No.: US 8,391,679 B2
(45) Date of Patent: Mar. 5, 2013

(54) DIGITAL BROADCAST RECEIVER AND DIGITAL DEVICE SYSTEM

(75) Inventor: Yoshiyasu Ogasawara, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 1078 days.

(21) Appl. No.: 12/374,980

(22) PCT Filed: May 14, 2007

(86) PCT No.: PCT/JP2007/059873
§ 371 (c)(1),
(2), (4) Date: Jan. 23, 2009

(87) PCT Pub. No.: WO2008/012979
PCT Pub. Date: Jan. 31, 2008

(65) Prior Publication Data
US 2009/0317054 A1    Dec. 24, 2009

(30) Foreign Application Priority Data
Jul. 26, 2006  (JP) .................................. 2006-203664

(51) Int. Cl.
*H04N 5/76* (2006.01)
(52) U.S. Cl. ....................................... 386/291; 386/296
(58) Field of Classification Search .................. 386/291, 386/292, 296, 297
See application file for complete search history.

(56) References Cited

U.S. PATENT DOCUMENTS 5,541,738 A * 7/1996 Mankovitz .................... 386/245
5,991,832 A   11/1999 Sato et al.
(Continued)

FOREIGN PATENT DOCUMENTS

JP    5-100060 A    4/1993
JP   80138276 A    5/1996
(Continued)

OTHER PUBLICATIONS

"High-Definition Multimedia Interface Specification Version 1.2" Supplement 1, Aug. 22, 2005, pp. 1-89, XP003003035.
(Continued)

*Primary Examiner* — Robert Chevalier
(74) *Attorney, Agent, or Firm* — Birch, Stewart, Kolasch & Birch, LLP

(57) ABSTRACT

"Reservation with a recorder" is decided by a remote control operation of a TV (101) and an operation target device is decided (102). To the decided operation target device (recorder), key transmission is carried out from the TV (103). When the recorder receiving this key transmission is on standby, a power supply is turned on (104). Next, the recorder makes display request of an electronic program guide to the TV (105). Based on this, in the TV side, input switching is performed to HDMI of which display request is made from the recorder side (106). Meanwhile, in the recorder, a program guide display operation is performed (107). Various key operations (108) performed for the TV is sent to the recorder side (109), and in the recorder, various operations in the recorder side are performed (110) in response to the various key operations. Based on the electronic program guide which is displayed, recording reservation of a desired program can be made from the TV side. When the processing of the recorder side is completed (111), a notice of completion/input switching request is provided (112) to the TV from the recorder. The TV which receives this performs input switching to return to its original state (113), and the power supply is turned off in the recorder side (114).

4 Claims, 9 Drawing Sheets

U.S. PATENT DOCUMENTS

| | | |
|---|---|---|
| 7,027,716 B1 | 4/2006 | Boyle et al. |
| 2002/0053090 A1 | 5/2002 | Okayama et al. |
| 2006/0034587 A1 | 2/2006 | Yokota et al. |
| 2007/0297758 A1* | 12/2007 | Seo .................................. 386/83 |

FOREIGN PATENT DOCUMENTS

| | | |
|---|---|---|
| JP | 10-150611 A | 6/1998 |
| JP | 2000-82247 A | 3/2000 |
| JP | 2003-199012 A | 7/2003 |
| JP | 2004-153520 A | 5/2004 |
| JP | 2005-243166 A | 9/2005 |
| JP | 2005-244577 A | 9/2005 |
| JP | 2006-54642 A | 2/2006 |
| JP | 2006-74614 A | 3/2006 |
| WO | WO 02/37843 A1 | 5/2002 |
| WO | WO 03/096695 A1 | 11/2003 |

OTHER PUBLICATIONS

2004 Nen 5 Gatsu 20 Nichi, May 20, 2004, p. CEC-21-p. CEC-36 "CEC13 CEC Features Description", <URL:http://www.hdmi.org/download/HDMI_Specification_1.1.pdf>.

\* cited by examiner

DIGITAL BROADCAST RECEIVER AND DIGITAL DEVICE SYSTEM

TECHNICAL FIELD

The present invention relates to a digital broadcast receiver and a digital device system related to the same, and particularly to a technique for providing various functions when a plurality of devices are connected.

BACKGROUND ART

As the newest standard with general versatility for connecting a plurality of digital household electric appliances, the HDMI standard has been defined. In the HDMI standard, CEC (Consumer Electronics Control) protocol is used. By using the CEC protocol, coordination of the devices connected by the HDMI cables is designed.

TABLE 1

| CEC COMMANDS |
| --- |
| COMMON CODE |
| Image View On |
| Active Source |
| User Control Pressed |
| Record On |
| Record Off |
| StandBy |
| Set Stream Path |
| STANDARD ERROR MESSAGE |
| VENDER UNIQUE CODE |
| MENU SETTING TRANSFER |
| PROGRAM INFORMATION |
| SPECIAL REMOTE CONTROL KEY |
| DETAILED ERROR NOTIFICATION |

Table 1 shows examples of CEC commands, and the CEC commands are broadly divided into a common code which is provided for keeping general versatility and is common without depending on each appliance or a vender, and a unique code unique to a vender for allowing the degree of freedom, which the vender can uniquely define.

For example, a coordination system for allowing a device to have a function by using a vender unique code (command) of the HDMI has been announced.

DISCLOSURE OF THE INVENTION

Problems to be Solved by the Invention

However, in the products which have been announced up to now, the following problems arise when, for example, a liquid crystal television and a recording/reproducing device are connected with the HDMI cable.

1) When reservation of a program or the like is made in a recording/reproducing device (recorder), the recorder device is turned on, the external input screen of the recorder is displayed on the television by an input switching button, and the external input is set to the recorder in the TV screen. Thereafter, the mode has to be switched to the remote control operation mode, and the reservation function needs to be actuated by a menu key or the like. Therefore, time and effort are required especially for the input switching step in the TV.

2) The devices are linked only when reservation is registered, and if an error occurs to the recorder and the recorder cannot record a program, no countermeasures can be taken.

3) When the television and a plurality of recorders are connected, it becomes difficult to grasp which program has been already reserved, and operation and confirmation are complicated because reservation is managed separately in the television main body and a plurality of recorders.

The present invention has an object to provide various convenient functions when a plurality of digital devices are connected.

Means for Solving the Problems

In the present invention, the function of actuating/executing the function of reservation or the like with a remote control of the TV side is included. For example, as a reservation method using a vender unique command, in the television device capable of two-way communication with a recorder device capable of recording a digital broadcast, by communicating the information inside the devices with the protocol defined in advance between both the devices, the convenience of the reservation function is enhanced. Further, a "reservation with recorder" button is provided in the television (menu or a remote control). When the button is pressed, the recorder power supply is turned on. > The recorder program guide is displayed. > Processing of TV input switching is performed by communication by being properly timed. > At the completion of the reservation processing, input switch is returned to the original state, and the power supply of the recorder is turned off. Such operations are performed at one time.

In a "Recording list display" button, the same processing can be also performed. When reproduction is directly started, the state in which the power supply is on is continued, and when recording finishes without reproduction, the power supply is turned off similarly to reservation. An error notice from the recorder is monitored at the time of start of recording with the recorder, and when an error is reported, recording is automatically performed with other recording means. When the program guide/reservation list are displayed on the television, information of the program (Event ID) of which reservation is already made in the recorder side is transmitted to the television, and is reflected on the program guide.

More specifically, according to one aspect of the present invention, there is provided a digital device system, in a digital device system comprising a recording/reproducing device which is capable of recording a digital broadcast, and a television device which is capable of receiving a digital broadcast, and by being connected to the aforesaid recording/reproducing device, is capable of two-way communication between the devices in accordance with a protocol defined in advance between both the devices, characterized in that with an operation of actuating a function of making reservation with the recording/reproducing device in the aforesaid television device side, as a start, a series of operations of determining an operation target device by performing the two-way communication between the devices according to the aforesaid protocol defined in advance, receiving a display request of an electronic program guide from the recording/reproducing device to be the operation target and performing input conversion to the device which has the display request, and displaying the electronic program guide of the aforesaid recording/reproducing device in the aforesaid television device is performed.

The aforesaid series of operation finishes, and an operation relating to the aforesaid electronic program guide in the aforesaid television device side may be converted into a control signal of a reservation operation of program recording in the aforesaid recording/reproducing device side to be transmitted by the aforesaid communication.

Further, when the aforesaid reservation processing is completed, input switch of the aforesaid television device may be switched to an original television side by an instruction from the aforesaid recording/reproducing device, and processing of turning off a power supply of the aforesaid recording/reproducing device may be performed.

According to another aspect of the present invention, there is provided a digital device system, in a digital device system comprising a recording/reproducing device which is capable of recording a digital broadcast, and a television device which is capable of receiving a digital broadcast, and by being connected to the aforesaid recording/reproducing device, is capable of two-way communication between the devices in accordance with a protocol defined in advance between both the devices, characterized in that in menu display or a remote control operation in the aforesaid television device side, a menu or an operation button for making program reservation in the aforesaid recording/reproducing device side is provided.

Further, there is provided a television device, in a television device which is capable of receiving a digital broadcast, and by being connected to a recording/reproducing device, is capable of two-way communication between the devices in accordance with a protocol defined in advance between both the devices, characterized in that by a menu or an operation button for making program reservation in the aforesaid recording/reproducing device side, which is provided in the television device side, information for displaying an electronic program guide of the aforesaid recording/reproducing device in the aforesaid television device side is acquired from the aforesaid recording/reproducing device side, and the electronic program guide is displayed.

An ID of a program for which recording reservation is already made in the aforesaid recording/reproducing device side is received from the aforesaid recording/reproducing device, and the aforesaid electronic program guide which makes it discriminable whether a subject of a recording reservation operation is the aforesaid television device or the aforesaid recording/reproducing device is displayed.

According to another aspect of the present invention, there is provided a recording/reproducing device, in a recording/reproducing device which is capable of being connected with a television device capable of receiving a digital broadcast, and by being connected, is capable of two-way communication between the devices in accordance with a protocol defined in advance between the devices, the recording/reproducing device being capable of accepting by an operation in an electronic program guide created based on a program reservation in the aforesaid recording/reproducing device from the aforesaid television device side, characterized in that an ID of a program for which recording reservation is already made in the aforesaid recording/reproducing device side is sequentially sent to the aforesaid television side.

When the user presses the button or the like of the remote control, processing of turning on the recorder power supply > displaying the recorder program guide > performing processing of TV input switching is performed by communication by being properly timed. At the time of completion of reservation processing) input switch is returned to the original state, and the power supply of the recorder is turned off.

Further, there is provided a digital device system, in a digital device system comprising a recording/reproducing device which is capable of recording a digital broadcast, and a television device which is capable of receiving a digital broadcast, and by being connected to the aforesaid recording/reproducing device, is capable of two-way communication between the devices in accordance with a protocol defined in advance between both the devices, characterized in that with an operation of actuating a function of making reservation with the recording/reproducing device in the aforesaid television device side, as a start, a series of operations of determining an operation target device by performing the two-way communication between the devices in accordance with the aforesaid protocol defined in advance, receiving a display request of a recording reservation program list from the recording/reproducing device to be the operation target and performing input conversion to the device which has the display request, and displaying the recording program list of the aforesaid recording/reproducing device in the aforesaid television device is performed.

The aforesaid series of operation finishes, and it is preferable that an operation relating to the aforesaid recording reservation program list in the aforesaid television device side is converted into a control signal of a reservation operation of program recording in the aforesaid recording/reproducing device side to be transmitted by the aforesaid communication. Further, when the aforesaid reservation processing is completed, input switch of the aforesaid television device may be switched to an original television side by an instruction from the aforesaid recording/reproducing device, and processing of turning off a power supply of the aforesaid recording/reproducing device may be performed.

Further, there is provided a digital device system, in a digital device system comprising a recording/reproducing device which is capable of recording a digital broadcast, and a television device which is capable of receiving a digital broadcast, and by being connected to the aforesaid recording/reproducing device, is capable of two-way communication between the devices in accordance with a protocol defined in advance between both the devices, characterized in that in menu display or a remote control operation in the aforesaid television device side, a menu or an operation button for performing display of a recording reservation program list in the aforesaid recording/reproducing device side is provided.

Further, there is provided a television device, in a television device which is capable of receiving a digital broadcast, and by being connected to a recording/reproducing device, is capable of two-way communication between the devices in accordance with a protocol defined in advance between both the devices, characterized in that by a menu or an operation button for making program reservation in the aforesaid recording/reproducing device side, which is provided in the television device side, information for displaying a recording reservation list of the aforesaid recording/reproducing device in the aforesaid television device side is acquired from the aforesaid recording/reproducing device side, and the recording reservation list is displayed.

It is preferable that an ID of a program for which recording reservation is already made in the aforesaid recording/reproducing device side is received from the aforesaid recording/reproducing device, and the aforesaid recording reservation list which makes it discriminable whether a subject of a recording reservation operation is the aforesaid television device or the aforesaid recording/reproducing device is displayed.

According to another aspect of the present invention, there is provided a recording/reproducing device, in a recording/reproducing device which is capable of being connected to a television device capable of receiving a digital broadcast, and by being connected, is capable of two-way communication between the devices in accordance with a protocol defined in advance between both the devices, said recording/reproducing device being capable of accepting an operation based on a recording reservation list based on recording reservation in the aforesaid recording/reproducing device from the aforesaid television device side, characterized in that an ID of a program for which recording reservation is already made in the aforesaid recording/reproducing device side is sequentially sent to the aforesaid television side.

Further, there is provided a digital device system, in a digital device system comprising a first and second recording/reproducing devices which are capable of recording a digital broadcast, and a television device which is capable of receiving a digital broadcast, and by being connected to the aforesaid first and second recording/reproducing devices, is capable of two-way communication between the devices in accordance with a protocol defined in advance between the devices, characterized in that when program recording reservation in the aforesaid first recording/reproducing device is made in the aforesaid television device side, a certain time before start of reservation recording, it is determined whether recording which satisfies conditions set in advance is possible or not in the aforesaid first recording/reproducing device, when there is a condition which is not satisfied, an error notice is sent to the aforesaid television device by the aforesaid communication, and from the aforesaid television device which receives the error notice, a channel selection and recording instruction relating to a reserved program of which error notice is received is sent to the aforesaid second recording/reproducing device.

On end of program time relating to the aforesaid reserved program, a recording finish instruction may be sent to the aforesaid second recording/reproducing device from the aforesaid television device. The aforesaid channel selection and recording instruction is preferably an instruction to record so as to complement a part which does not satisfy the aforesaid conditions set in advance. When recording in the aforesaid second recording/reproducing device is successful, success in recording may be reported to the aforesaid television device from the aforesaid second recording/reproducing device.

According to another aspect of the present invention, there is provided a television device, in a television device which is capable of receiving a digital broadcast, and by being connected to a first and second recording/reproducing devices capable of recording a digital broadcast, is capable of two-way communication between the devices in accordance with a protocol defined in advance between the devices, characterized in that when program recording reservation in the aforesaid first recording/reproducing device is made in the aforesaid television device side, a certain time before start of reservation recording, it is determined whether recording which satisfies conditions set in advance is possible or not in the aforesaid first recording/reproducing device, when there is a condition which is not satisfied, an error notice is sent to the aforesaid television device by the aforesaid communication, and from the aforesaid television device which receives the error notice, a channel selection and recording instruction relating to a reserved program of which error notice is received is sent to the aforesaid second recording/reproducing device.

EFFECT OF THE INVENTION

According to the present invention, there is provided the advantage of being capable of displaying and operating a program guide and a recording list of a recorder from the remote control of a television with a small number of steps. Further, when an error occurs during recording, a recording instruction can be sent to another recorder/television main body through the television, and a failure in recording is decreased. Further, there is provided the convenience that the reservation situation in a plurality of recorder/television main bodies can be grasped in the program guide of the television.

DESCRIPTION OF SYMBOLS

A . . . digital broadcast receiver; B . . . DVD recorder, 1 . . . antenna, 3 . . . digital broadcast receiving part, 5 . . . HDMI interface part, 7 . . . HDMI signal processing part, 11 . . . decoder, 15 . . . remote control photoreceptor, 17 . . . control part (CPU), 18 . . . storage part) 21 . . . speaker, 23 . . . display, 25 . . . audio signal processing part, 27 . . . video signal processing part, 41 . . . antenna, 43 . . . digital tuner, 45 . . . HDMI signal processing part, 47 . . . control part, 51 . . . remote control photoreceptor, 53 . . . storage part (HDD), 55 . . . HDMI interface part, 57 . . . electronic program guide acquiring part, 63 . . . optical disk drive part, 67 . . . operation part

BEST MODE FOR CARRYING OUT THE INVENTION

Figure 1:
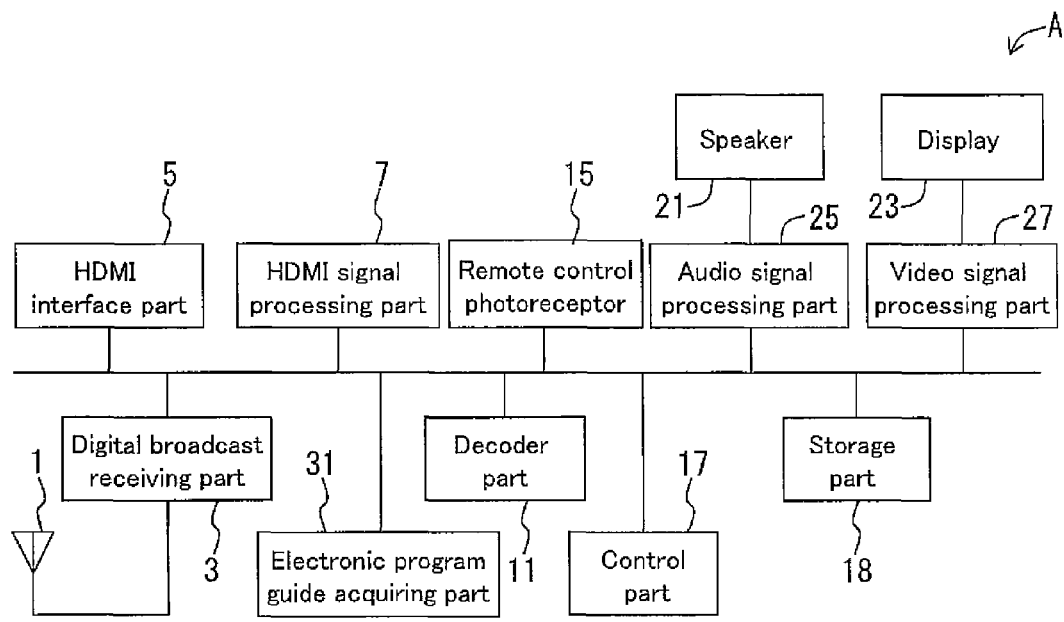
FIG. 1 is a functional block diagram showing one configuration example of a liquid crystal television device capable of receiving a digital broadcast which is one example of a connection source electronic device of a system shown in the following FIG. 3.
Figure 2:
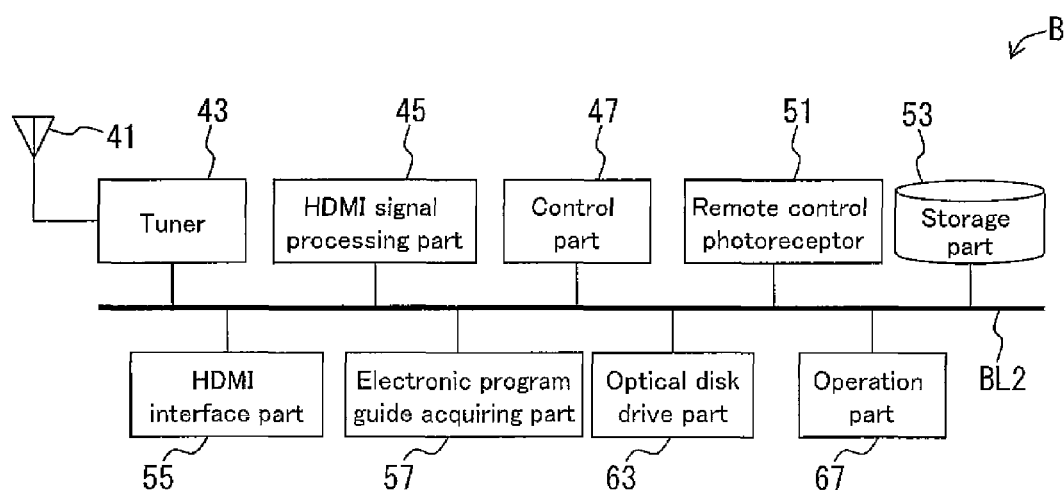
FIG. 2 is a functional block diagram showing one configuration example of a DVD recorder (recording/reproducing device) which is one example of a connection destination electronic device of the system shown in FIG. 3.
Figure 3:
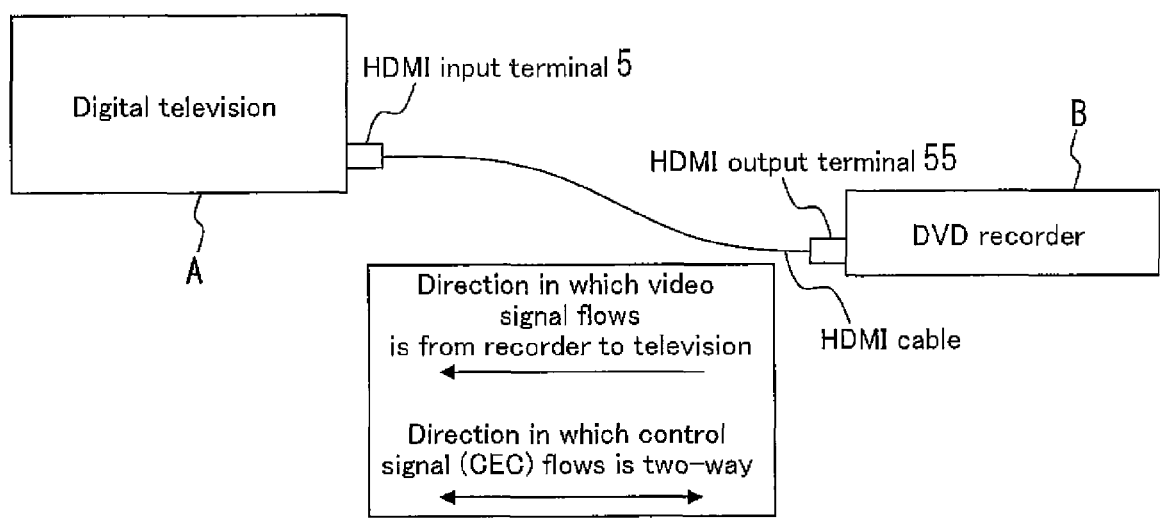
FIG. 3 is a diagram showing one configuration example of an electronic device system according to the present embodiment.

Hereinafter, an electronic device system according to an embodiment of the present invention will be described with reference to the drawings with an example of a system based on the HDMI standard. FIG. 3 is a diagram showing one configuration example of an electronic device system according to the present embodiment. FIG. 1 is a functional block diagram showing one configuration example of a liquid crystal television device (hereinafter, called a digital broadcast receiver) capable of receiving a digital broadcast which is an example of a connection source electronic device of the system shown in FIG. 3. FIG. 2 is a functional block diagram showing one configuration example of a DVD recorder (recording/reproducing device) which is one example of a connection destination electronic device of the system shown in FIG. 3.

The above described Table 1 shows examples of the CEC command (code). As shown in Table 1, the CEC commands include common codes in the HDMI standard and unique codes which are unique to a vender. Here, the vender unique codes include the codes relating to transfer of menu setting, program information, a special remote control key, detailed error notification and the like. Specifically, the reservation function of the recorder can be set with a degree of freedom by the vender.

As shown in FIG. 1, a digital broadcast receiver A has an antenna 1, a digital broadcast receiving part 3 including a tuner of a digital broadcast, an HDMI interface part 5, an HDMI signal processing part 7, a decoder 11, a remote control photoreceptor 15, an audio signal processing part 25 which performs processing of an audio signal, a speaker 21 which outputs sound based on the audio signal after processing, a video signal processing part 27 which performs processing of a video signal, a display 23 which outputs video based on the video signal after processing, a control part (CPU) 17 which controls each of these function blocks through a bus line, and a storage part 18 which stores a program and the other information for performing the following processing.

As shown in FIG. 2, a DVD recorder B has an antenna 41, a digital tuner 43, an HDMI signal processing part 45, a control part 47, a remote control photoreceptor 51, a storage part (HDD) 53, an HDMI interface pail 55, an electronic program guide acquiring part 57, an optical disk drive part 63 such as a DVD, and an operation part 67.

FIG. 3 is a diagram showing a state in which the HDMI input terminal 5 of the digital broadcast receiver A and the HDMI output terminal 55 of the DVD recorder B shown in FIG. 1 and FIG. 2 are connected by the HDMI cable. A video signal flows to the digital broadcast receiver A from the DVD recorder B as shown by the arrow, between the digital broadcast receiver A and the DVD recorder B, and a control signal (CEC code) flows in both directions between the digital broadcast receiver A and the DVD recorder B. Control processing between the devices can be performed based on exchange of the control signals of the CEC codes through the HDMI cable between the devices.

Figure 4:
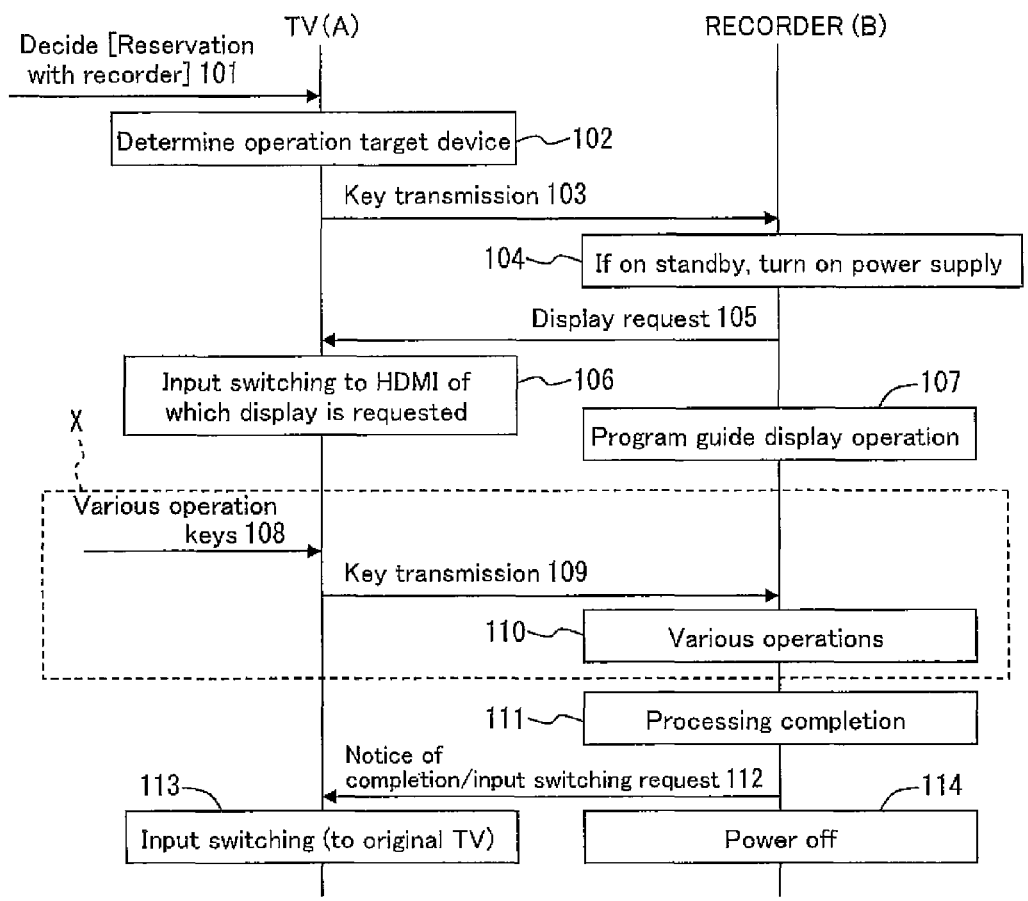
FIG. 4 is a sequence diagram showing an example of processing in a function of making reservation with a recorder according to the present embodiment.
Figure 5:
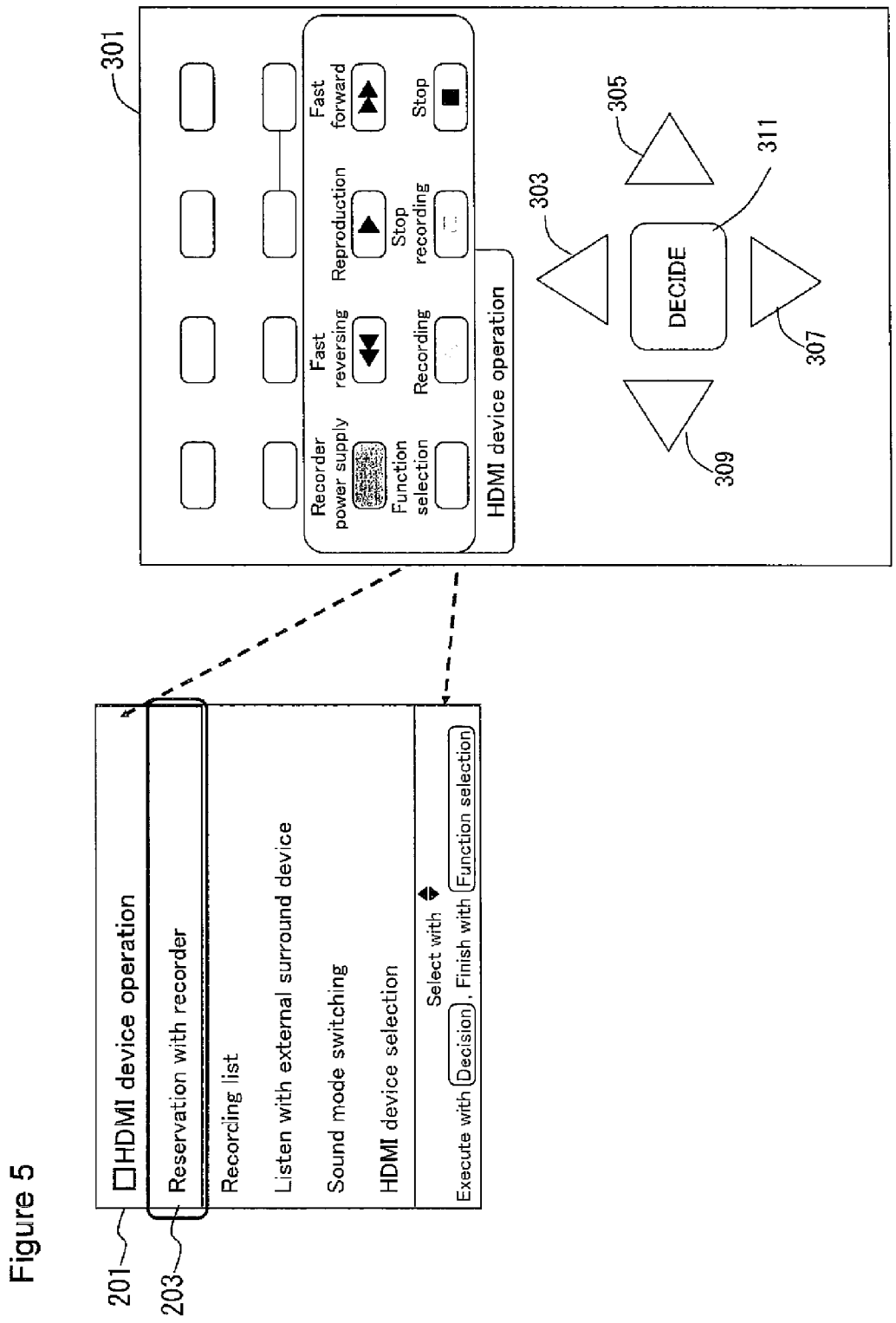
FIG. 5 is a diagram showing a part of an operation part of a remote control device and an example of an operation menu by a GUI on a TV side based on operation of the operation part.

Hereinafter, the function of making reservation with a recorder which is the first example of the function relating to an electronic device system according to a first embodiment of the present invention will be described with reference to the drawings. FIG. 4 is a sequence diagram showing an example of processing in the function of making reservation with a recorder according to the present embodiment. FIG. 5 is a diagram showing a pail of an operation part of a remote control device 301, and an operation menu example 201 by a GUI on a TV side based on the operation of the operation part. The determination standard of the operation target device is as follows.

1) When the viewing screen is a CEC-compatible device, the device provides viewing is the operation target device;

2) When the viewing screen is other than a CEC compatible device, the CEC-compatible device registered in advance is the operation target device.

For example, when a function election key provided in the remote control 301 of a TV (A) is pressed, a menu screen designated by 201 is displayed on the TV side. In the menu display 201, an item 203 "Reservation with recorder" is newly provided. When the item "Reservation with recorder" is selected with direction keys 303, 305, 307 and 309, and the decision operation is performed with a decision key 311, the operation of processing of making reservation with the recorder can be performed with a remote control on the TV side.

As shown in FIG. 4, reservation with the recorder is decided by a TV (A) remote control operation (101). On the TV (A) side, the operation target device is decided based on the standard of the above described 1) and 2) (102). Key transmission is performed from the TV (A) to the decided operation target device (recorder (B) in this case) (103). When the recorder (B) which receives the key transmission is on standby, the power supply is turned on (104). Next, the recorder (B) requests the TV (A) to display an electronic program guide (105). Based on this, the TV (A) side performs input switching to the HDMI of which display is requested by the recorder (B) side (106). Meanwhile, the recorder (B) performs a program guide display operation 107.

Since the part enclosed by a broken line X corresponds to the operation in the recorder (B) side, various kinds of key operations (108) performed for the TV (A) is sent to the recorder (B) side in key transmission 109, and in the recorder (B), various operations 110 in the recorder (B) side are performed in response to the various key operations 108. More specifically, the remote control operation to the TV (A) in the broken line region becomes a through operation to the recorder (B). For example, based on the electronic program guide which is displayed, recording reservation of a desired program can be made from the TV (A) side.

When the processing of the recorder (B) side is completed (111), the recorder (B) issues a notice of completion/input switching request 112 to the TV (A). The TV (A) which receives this switches the input so that the TV returns to the original state (113), and the recorder turns off the power supply (114). However, when the power supply of the recorder (B) is originally on, the processing of turning off the power supply is not performed with the intension to return to the original state.

As described above, in the function of making reservation with the recorder, setting is made in advance in the code of the vender side so that adjustment is performed between the connection source device and the connection destination device and input switching is performed, in advance by the two-way communication. Therefore, various key operations in the connection source device thereafter becomes various operations to the connection destination device, and, for example, the operation of make reservation with the recorder can be performed based on the operation of the TV side. For example, the electronic program guide of the recorder (B) can be displayed and operated from the TV (A) with a small number of steps with only the remote control operation of the TV (A) side. The example in which the selection menu choices to be reserved in the recorder side are provided in the GUI in the TV side is described, but the same processing may be performed by providing a recorder reservation button in the remote control 301.

Figure 6:
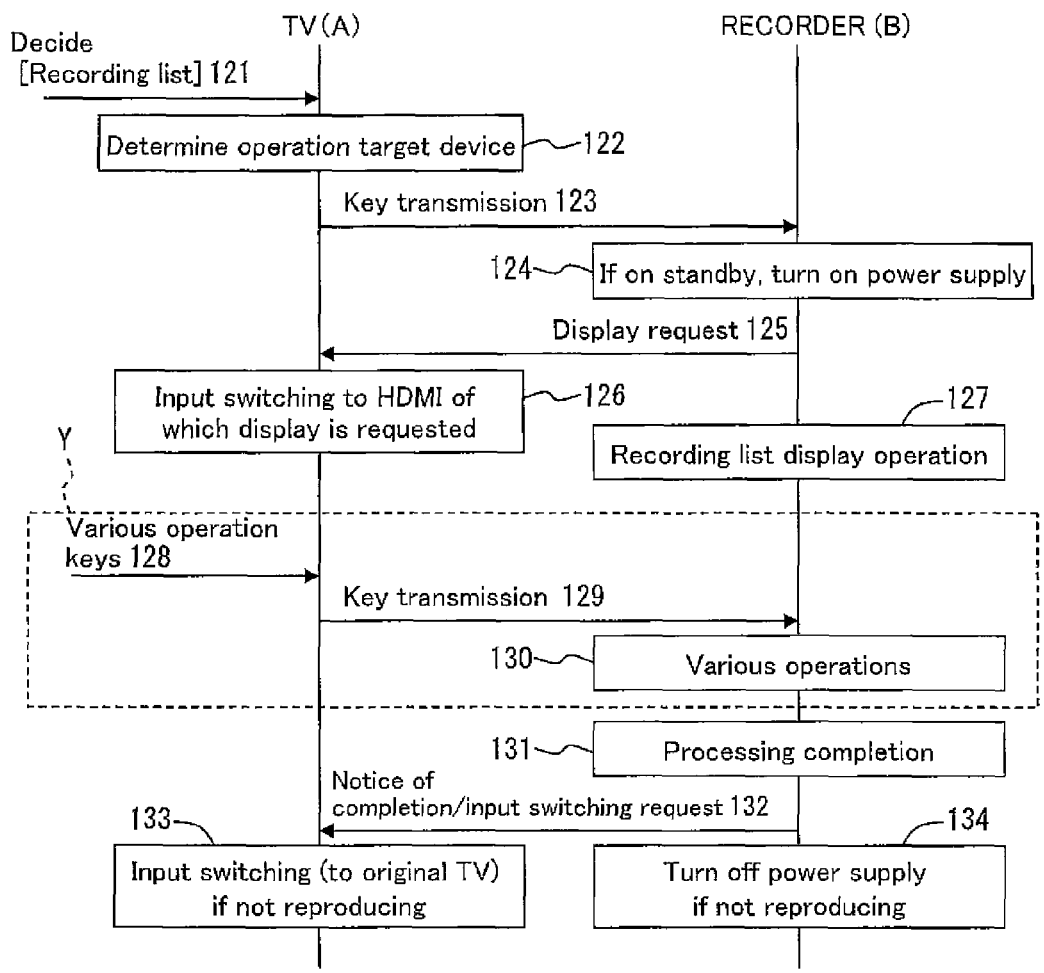
FIG. 6 is a sequence diagram showing an example of processing in a "recording list" function according to the present embodiment.
Figure 7:
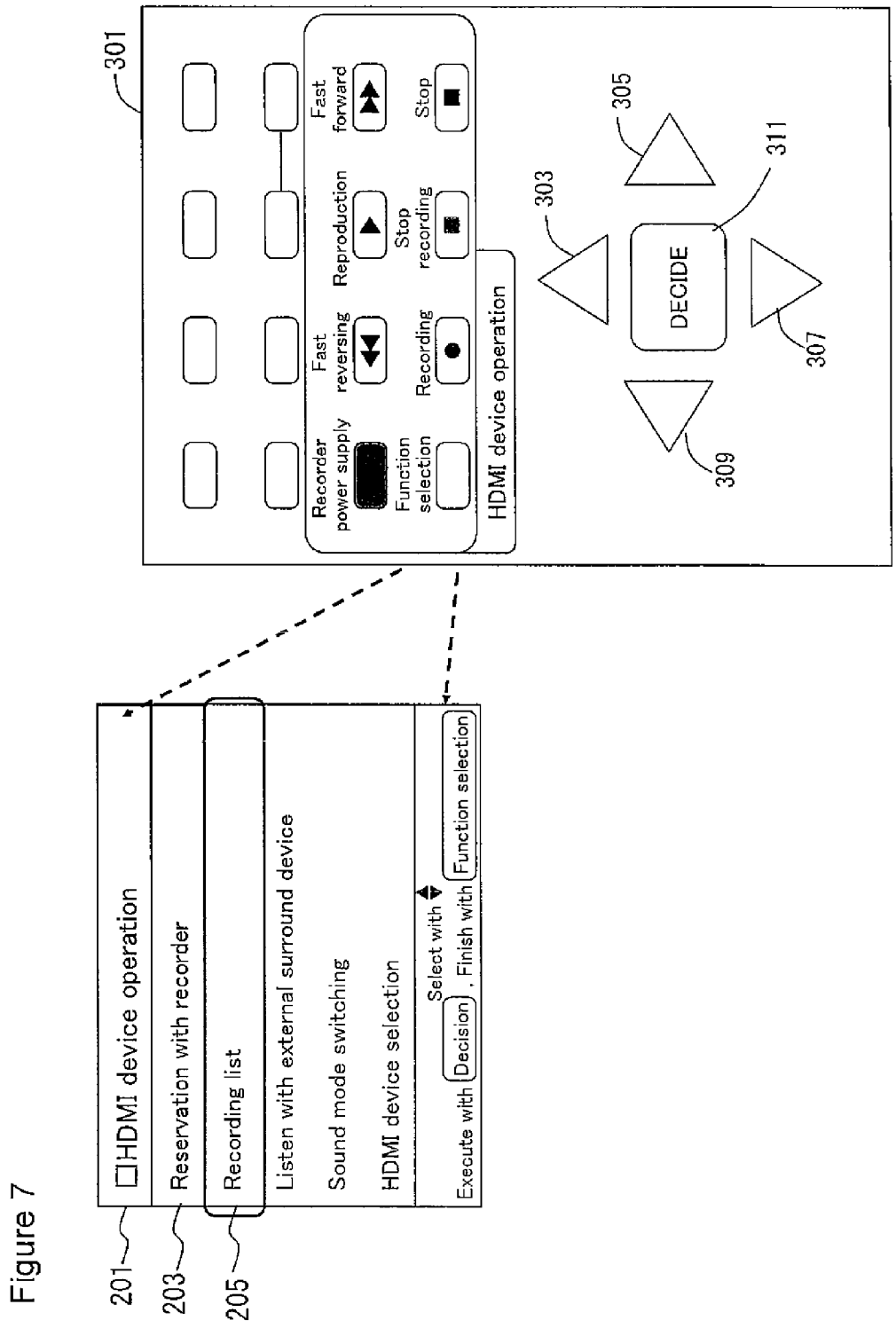
FIG. 7 is a diagram showing a part of an operation part of a remote control device, and an example of an operation menu by a GUI on a TV side based on operation of the operation part.

Next, a function of displaying a recording list which is a second example of a function relating to an electronic device system according to a second embodiment of the present invention will be described with reference to the drawings. FIG. 6 is a sequence diagram showing an example of processing in the "recording list" function according to the present embodiment. FIG. 7 is a diagram showing a part of the operation part of the remote control device 301, and an operation menu example 201 by the GUI on the TV side based on the operation of the operation part. The determination standard of the operation target device is the same as in the case of the first embodiment.

When, for example, the function selection key provided in the remote control device 301 of the TV (A) is pressed, the menu screen shown in 201 is displayed on the TV side. In the menu display 201, an item 205 "Recording list" is newly provided. When the item 205 "Recording list" is selected by the direction keys 303, 305, 307 and 309, and die decision operation is performed by the decision key 311, the operation of processing of displaying the recording list can be performed by the remote control on the TV side.

As shown in FIG. 6, the recording list is decided by the remote control operation of the TV (A) (121). In the TV (A) side, the operation target device is decided based on the standard of the above described 1) and 2) (122). Key transmission is performed from the TV (A) to the decided operation target device (recorder (B), in this case) (123). If the recorder (B) which receives the key transmission is on standby, the power supply is turned on (124). Next, the recorder (B) requests the TV (A) to display the recording list (125). Based on the request, in the TV (A) side, input is switched to the HDMI of which display is requested from the recorder (B) side (126). Meanwhile, a recording list display operation 127 is performed in the recorder (B).

Since the part enclosed by the broken line Y corresponds to the operation in the recorder (B) side, various key operations (128) performed for the TV (A) are sent to the recorder (B) side in key transmission 129, and various operations 130 in the recorder (B) side are performed in response to the various key operations 128 in the recorder (B). Specifically, the remote control operation to the TV (A) in the region of the broken line becomes a through operation to the recorder (B). For example, based on the displayed recording list, instruction of the processing of reproducing a desired program can be performed from the TV (A) side.

When the processing in the recorder (B) side is completed (131), a notice of completion/input switching request 132 is issued to the TV (A) from the recorder (B), and the TV (A) which receives this performs input switching to be the original TV (133), and the power supply is turned off in the recorder side (114). However when the power supply of the recorder (B) is originally on, the processing of turning off the power supply is not performed with the intention to return to the original state.

As described above, in the recording list function, setting is made in advance in the code of the vender side so that adjustment is performed between the connection source device and the connection destination device, and input switching is performed, in advance by the two-way communication. Therefore, various key operations in the connection source device thereafter become various operations to the connection destination device, and, for example, the operation of making reservation with the recorder can be performed based on the operation of the TV side. More specifically, the recording list of the recorder (B) can be displayed and operated from the remote control of the TV (A) with a small number of steps with only the remote control operation of the TV (A) side. The example in which the selection menu choices to be reserved in the recorder side are provided in the GUI in the TV side is described, but the same processing may be performed by providing a recorder reservation button in the remote control 301.

Figure 8:
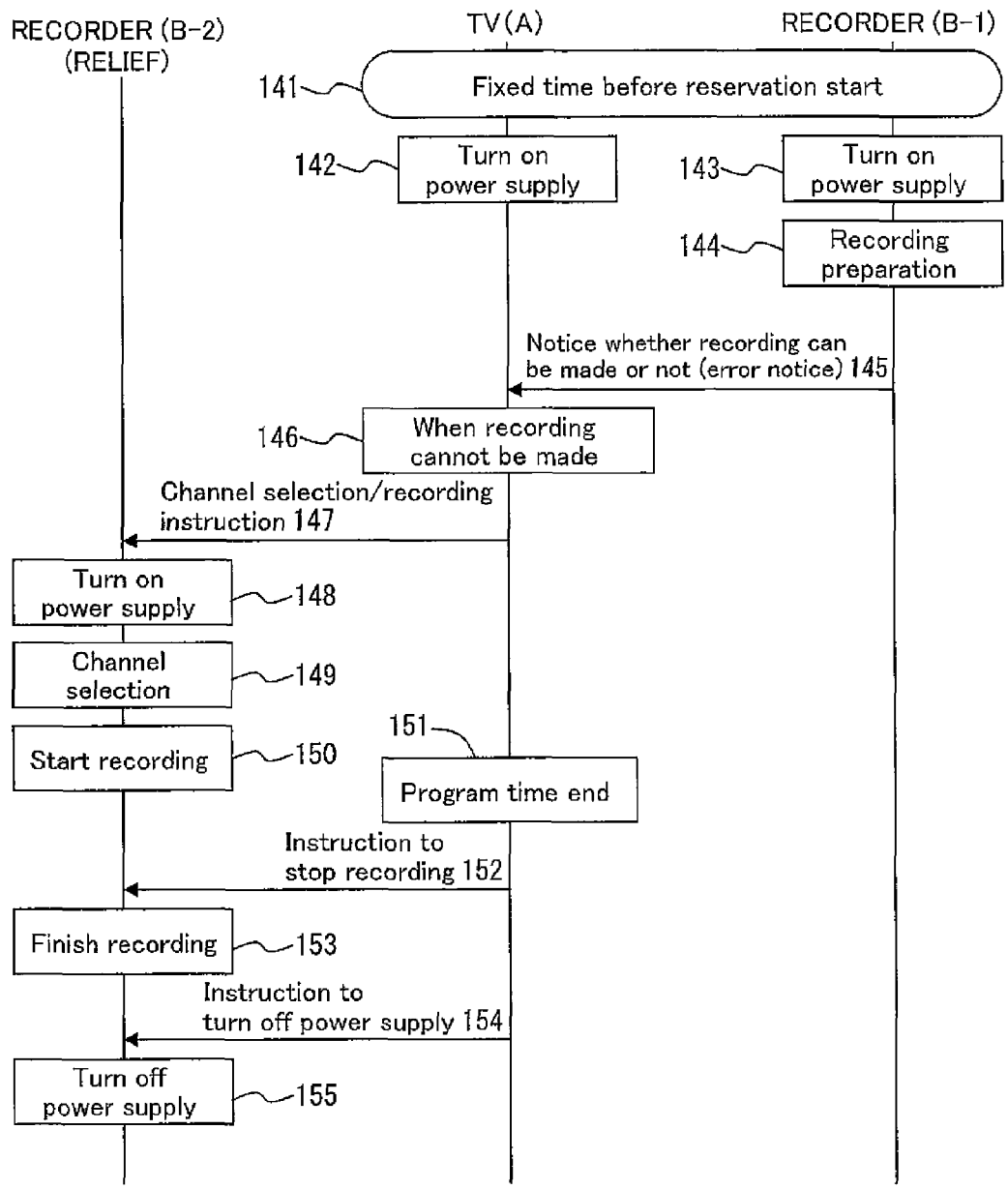
FIG. 8 is a sequence diagram showing an example of processing in a "relief" function according to a third embodiment of the present invention.

Next, a relief function in the case of failure of recording processing which is a third example of a function relating to an electronic device system according to a third embodiment of the present invention will be described with reference to the drawings. FIG. 8 is a sequence diagram showing an example of processing in the relief function according to the present embodiment. The determination standard of the operation target device is the same as in the case of the first embodiment.

In the relief function according to the present embodiment, for example, the TV (A), a recorder (B-1), and a recorder (B-2) which is a relief of the recorder (B-1) are connected with the HDMI cable. When both power supplies of the TV (A) and the recorder (B-1) are turned on (142, 143) a certain time before a reservation recording start time (141), recording preparation is made in the recorder (B-1) (144). If the recorder (B-1) has only the residual storage capacity of one hour, for example, when a program of three hours is to be recorded, all error notice 145 is issued to the TV (A) from the recorder (B-1) before the start of recording, for example. The TV (A) knows that complete recording processing cannot be performed in the recorder (B-1) (146), and performs a channel selection/recording instruction 147 to the recorder (B-2) which is designated as a relief for such a case in advance.

Thereupon, the power supply of the recorder (B-2) is turned on (148), and channel selection 149/start of recording 150 are performed. When the TV (A) knows the end of the program time (151), it transmits a recording stop instruction 152 to the recorder (B-2), and on receiving this, recording finishing processing 153 is performed in the recorder (B-2). Further, an instruction to turn off the power supply is issued to the recorder (B-2) from the TV (A) (154), and the power supply of the recorder (B-2) is turned off (155).

Thus, when the relief function is used, by deciding in advance the second recorder to be the relief if recording by the first recorder cannot be made, a failure in recording can be prevented. On this occasion, when recording is successful owing to the relief, it is reported to the TV side that the recording is successful, and "Recording is successful" may be displayed on the screen of the TV.

By using the error notification determined by the common code, the above described relief function can be realized, but quicker response can be made at the time of occurrence of an error by using the code dependent on the vender, and therefore, this is excellent as the relief function. Specifically, with the common code, error notice is issued after recording starts, and therefore, action is delayed correspondingly. When processing of an error signal can be performed even when the TV is on standby, the above described turning on the power supply 142 is not necessary.

When the above described function is used, the program also can be recorded in the relief side midway from the point of time at which the capacity runs out instead of recording entire program in the relief side when the capacity runs out. The relief side has various constraints, though the interface other than that of the HDMI, such as ilink and a video control, is applicable. However, the recording method of the device for relief needs to be determined by performing setting in advance. Since in the case of the HDMI, instruction of input switching and channel selection can be sent, the constraint decreases, and recording can be realized more reliably.

Figure 9:
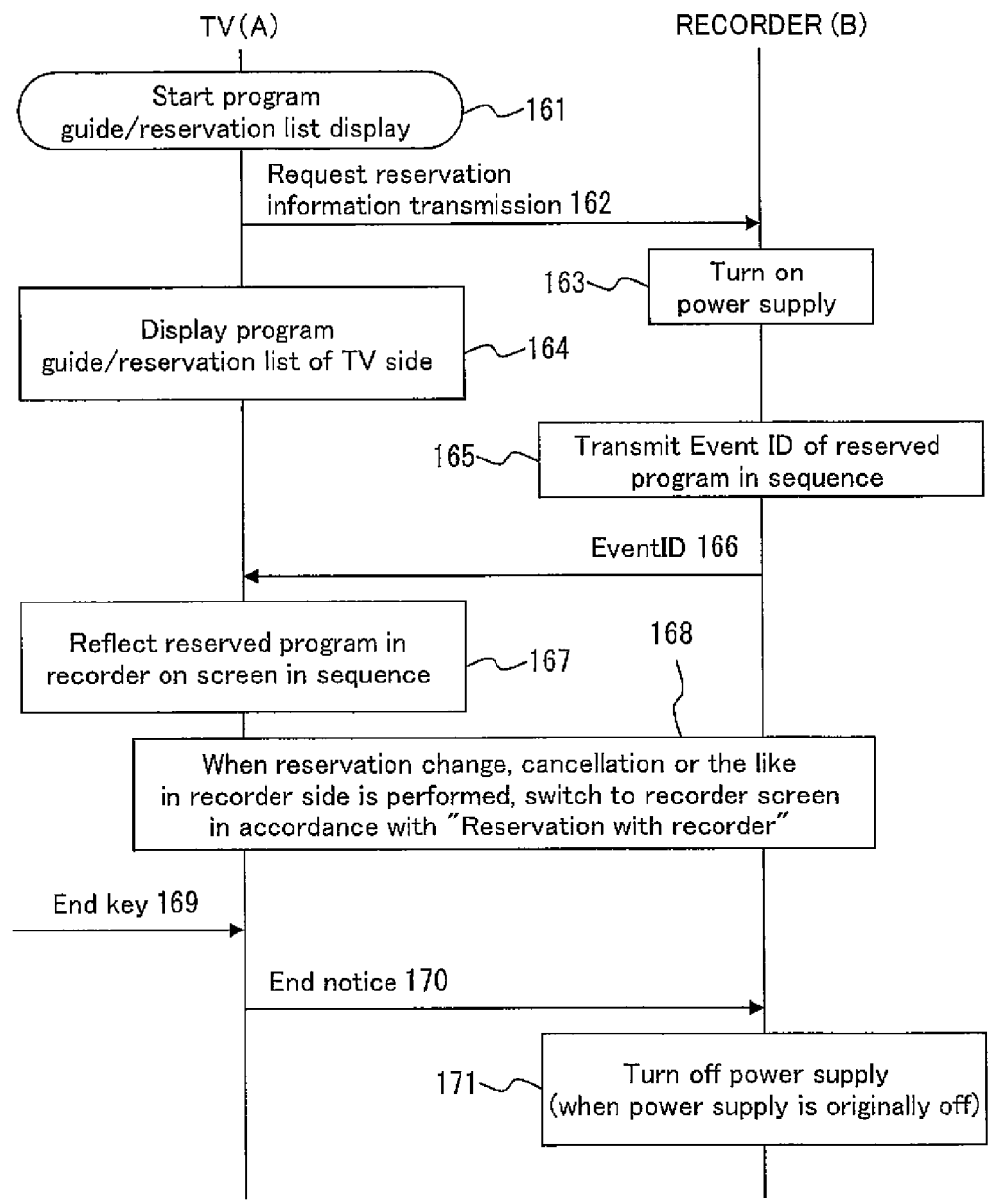
FIG. 9 is a sequence diagram showing an example of processing in a function of "reflection of a reservation situation in a recorder side" according to a fourth embodiment of the present invention.
Figure 10:
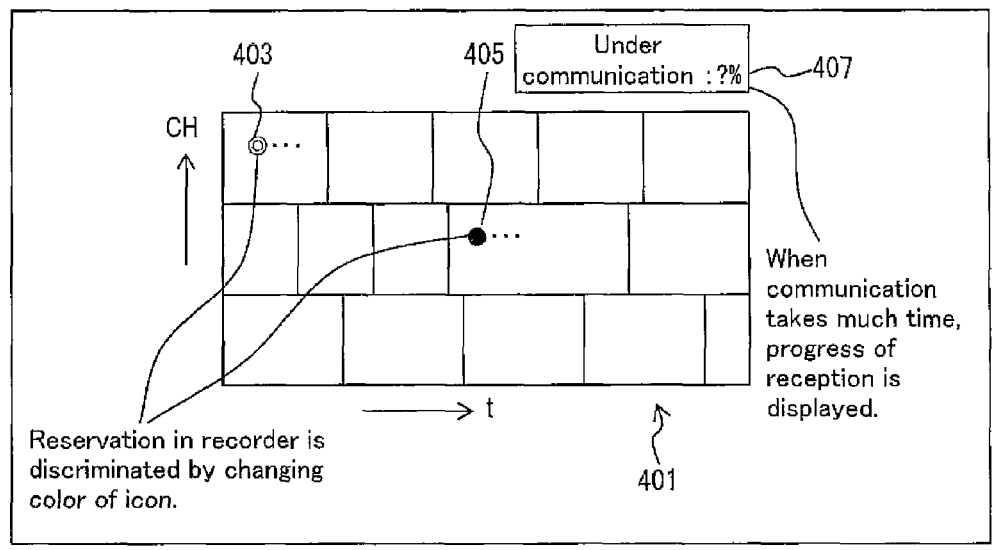
FIG. 10 is a diagram showing a display example of a program guide.
Figure 11:
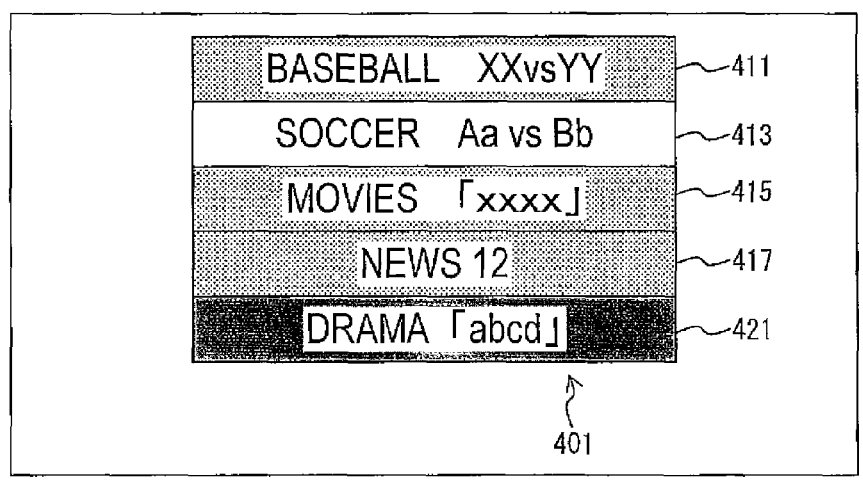
FIG. 11 is a diagram showing a display example of a reservation list.

Next, the function of reflecting a reservation situation in the recorder side which is a fourth example of the function relating to an electronic device system according to a fourth embodiment of the present invention will be described with reference to the drawings. FIG. 9 is a sequence diagram showing an example of the processing in the function of "reflection of the reservation situation in the recorder side"

according to the present embodiment. FIG. 10 is a diagram showing a display example of a program guide, and FIG. 11 is a diagram showing a display example of a reservation list.

As described in the above described first or second embodiment, when display start 161 of the program guide or reservation list is performed in the TV (A), for example, a reservation information transmission request 162 is transmitted to the recorder (B). On receiving this, in the recorder (B), the power supply is turned on (163). In the TV (A) side, the program guide/reservation list of the TV side is displayed (164). Here, in both the TV side (A) and the recorder side (B), event ID uniquely identifying which program is already reserved is tabled and stored, for example. In the recorder (B) side, the event ID of the reserved program is sequentially transmitted to the TV (A) side (165/166). Transmission of the event ID is sent in the code dependent on the vender. In the TV (A) side, the event ID is received, and the reserved program in the recorder (B) side is sequentially reflected in the screen display. The reason why the event ID is sequentially reflected is that the communication speed is low, and if it is collectively transmitted, display will be delayed.

Next, when in the television side (A) and the recorder side (B), reservation change, cancellation or the like in the recorder side is performed, operation is made by switching lie screen to the recorder screen in accordance with "Reservation with recorder" shown in the first embodiment. When the end key is pressed in the TV (A) side (169), an end notice 170 is sent to the recorder side (B) from the TV (A) side. The recorder which receives this turns off the power supply when the power supply is originally turned off (171).

As shown in FIG. 10, reservation of the recorder is performed by using an electronic program guide 401 displaying the programs based on the channel axis and the time axis. In this case, reservation in the recorder and reservation in the TV can be discriminated by making the colors of icons differ between them as shown by reference numerals 403 and 405 in accordance with the regions of the programs of the electronic program guide 401. Considering the case when communication takes much time, progress of the reception processing of the event ID is displayed in the region shown by reference numeral 407. On this occasion, the event ID is preferably stored in a memory or the like in sequence. Based on the information stored in the memory, the following list can be displayed.

As shown in FIG. 11, in the reservation list 410, the reservation in the recorder and the reservation in the TV side can be made discriminable in the programs 411 to 421 displayed in the reservation list.

Thus, by making it discriminable which device makes the reservation, there is provided the advantage of being capable of grasping and collectively managing the reservation situation in a plurality of recorders and televisions in the television side.

As described above, according to the electronic device system according to each of the embodiments of the present invention, the program guide and the recording list of the recorder can be displayed and operated with the small number of steps from the remote control of the television, and therefore, the advantage of increasing convenience is provided. Further, when an error occurs at the time of recording, the recording instruction can be sent to another recorder/television main body through the television, and a failure in recording can be decreased. Further, there is provided the advantage of being capable of grasping the reservation situation in a plurality of recorders/television main bodies in the program guide of the television.

The recording/reproducing device is a so-called recorder, and is a device under the condition of including at least either a built-in recording device such as an HDD or a drive device for a recording medium.

Industrial Applicability

The present invention is applicable to an HDMI connection device system.

The invention claimed is:

1. A digital device system, comprising:

a recording/reproducing device configured to record a digital broadcast; and a television device configured to receive a digital broadcast, the television device connected to said recording/reproducing device and configured to perform two-way communication with the recording/reproducing device in accordance with a protocol defined in advance between both the devices, wherein the digital device system is configured to actuate a function of making reservation with the recording/reproducing device, as a start, the digital device system is further configured to perform a series of operations of determining an operation target device by performing the two-way communication between the recording/reproducing device and the television device according to said protocol defined in advance, the television device is configured to receive a display request of an electronic program guide from the recording/reproducing device and a request to be the operation target, the television device is further configured to perform input switching to the recording/reproducing device having sent the display request, the television device is further configured to display the electronic program guide of said recording/reproducing device, when said reservation processing is completed, the digital device system is configured to switch input of said television device to an original television side by an instruction from said recording/reproducing device, and the digital device system is further configured to perform turning off a power supply of said recording/reproducing device.

2. The digital device system according to claim 1, wherein said series of operation finishes, and an operation relating to said electronic program guide in said television device side is converted into a control signal of a reservation operation of program recording in said recording/reproducing device side to be transmitted by said communication.

3. A digital device system, comprising:

a recording/reproducing device configured to record a digital broadcast; and a television device configured to receive a digital broadcast, the television device connected to said recording/reproducing device and configured to perform two-way communication with the recording/reproducing device in accordance with a protocol defined in advance between both the devices, wherein the digital device system is configured to actuate a function of making reservation with the recording/reproducing device, as a start, the digital device system is further configured to perform a series of operations of determining an operation target device by performing the two-way communication between the recording/reproducing device and the television device in accordance with said protocol defined in advance, the television device is configured to receive a display request of a recording reservation program list from the recording/reproducing device and a request to be the operation target, the television device is further configured to perform input switching to the recording/reproducing device having sent the display request, the television device is further configured to display the recording program list of said recording/reproducing device, when said reservation processing is completed, the digital device system is configured to switch input of said television device to an original television side by an instruction from said recording/reproducing device, and the digital device system is further configured to perform turning off a power supply of said recording/reproducing device.

4. The digital device system according to claim 3, wherein said series of operation finishes, and an operation relating to said recording reservation program list in said television device side is converted into a control signal of a reservation operation of program recording in said recording/reproducing device side to be transmitted by said communication.

* * * * *